United States Patent
DiPiazza

(10) Patent No.: US 7,397,381 B2
(45) Date of Patent: Jul. 8, 2008

(54) RADIO FREQUENCY LOCATOR SYSTEM

(75) Inventor: Gerald Charles DiPiazza, Edenton, NC (US)

(73) Assignee: M/A-COM, Inc., Lowell, MA (US)

( * ) Notice: Subject to any disclaimer, the term of this patent is extended or adjusted under 35 U.S.C. 154(b) by 233 days.

(21) Appl. No.: 11/264,563

(22) Filed: Nov. 1, 2005

(65) Prior Publication Data

US 2008/0084314 A1    Apr. 10, 2008

(51) Int. Cl.
G08B 23/00    (2006.01)

(52) U.S. Cl. .............. 340/573.1; 340/539.13; 340/691.6; 340/825.49; 455/457

(58) Field of Classification Search .............. 340/573.1, 340/573.4, 539.11, 539.13, 572.1, 572.4, 340/825.49, 10.1, 691.6; 455/456.1, 456.5, 455/456.6, 457
See application file for complete search history.

(56) References Cited

U.S. PATENT DOCUMENTS

| | | | |
|---|---|---|---|
| 4,495,496 A | 1/1985 | Miller, III | |
| 4,955,000 A | 9/1990 | Nastrom | |
| 4,998,095 A * | 3/1991 | Shields | 340/825.49 |
| 5,438,321 A | 8/1995 | Bernard et al. | |
| 5,977,913 A | 11/1999 | Christ | |
| 6,483,427 B1 | 11/2002 | Werb | |
| 6,531,963 B1 | 3/2003 | Nyfelt | |
| 7,030,765 B2 * | 4/2006 | Giraldin et al. | 340/573.1 |
| 2002/0147650 A1 | 10/2002 | Kaufman et al. | |
| 2002/0183979 A1 | 12/2002 | Wildman | |
| 2003/0011477 A1 * | 1/2003 | Clapper | 340/573.1 |
| 2003/0129977 A1 | 7/2003 | Dolwin | |
| 2003/0197607 A1 * | 10/2003 | Striemer | 340/539.1 |
| 2003/0210148 A1 | 11/2003 | Imasaki et al. | |
| 2003/0220092 A1 | 11/2003 | Hethuin et al. | |
| 2004/0061646 A1 | 4/2004 | Andrews et al. | |
| 2004/0078151 A1 | 4/2004 | Aljadeff et al. | |
| 2006/0208888 A1 * | 9/2006 | Patel et al. | 340/572.1 |
| 2006/0232406 A1 * | 10/2006 | Filibeck | 340/572.1 |

FOREIGN PATENT DOCUMENTS

WO    WO 99/23623    5/1999

* cited by examiner

Primary Examiner—Thomas Mullen

(57) ABSTRACT

A radio frequency locator system is provided that includes a plurality of locator elements configured to communicate using a radio frequency identification (RFID) communication system and at least one communication device configured to receive locator information from at least one of the plurality of locator elements. The radio frequency locator system further includes a user interface configured to display location information based on the received locator information and includes a plurality of user input fields configured to receive a user input to define a search criteria.

21 Claims, 4 Drawing Sheets

| ID # | Location | Time | Device Transmitting | Status |
|------|----------|------|---------------------|--------|
| xxx | xxx | xxx | xxx | xxx |
| xxx | xxx | xxx | xxx | xxx |
| xxx | xxx | xxx | xxx | xxx |
| xxx | xxx | xxx | xxx | xxx |
| ⋮ | ⋮ | ⋮ | ⋮ | ⋮ | ced
RADIO FREQUENCY LOCATOR SYSTEM

BACKGROUND OF THE INVENTION

This invention relates generally to wireless communication systems and, more particularly, to a system for determining location information using radio frequency identification (RFID) devices.

Different systems and technologies are known for use in determining location information. For example, current technology provides for locating personnel in a building based on global positioning system (GPS) and/or radio triangulation methods. These methods generally can provide accurate location information. However, in buildings, these methods provide limited accuracy due to marginal signal strength and multipath reflections.

In order to locate, for example, a person using a GPS or radio triangulation method, the person must be carrying the GPS or radio device and that device must be operating. In emergency or catastrophic situations, for example, such as a fire, explosion, etc. in a building, there is a high probability that the GPS or radio device will be destroyed or rendered inoperable as a result of the conditions or effects in the post event disaster zone. Additionally, there is a possibility that during the catastrophic event and because of, for example, panic, a person may lose the GPS or radio device. In these situations, time is of the essence and reliable and accurate location information would increase the likelihood of locating a person trapped in a building after a catastrophic event. Further, it is typically not possible to determine the previous location for the person having the GPS or radio device because the information is not stored for later access, except maybe within the device itself. In particular, location information typically is not wirelessly transmitted and stored, but usually is stored, if at all, by downloading, for example, to a computer at a time much later than the actual use.

Thus, although GPS or radio triangulation systems are capable of providing reliable location information, in some situations or conditions, the information may not be reliable or may not be available. Further, these systems do not allow access to up to date archive location information.

BRIEF DESCRIPTION OF THE INVENTION

In an exemplary embodiment, a radio frequency locator system is provided that includes a plurality of locator elements configured to communicate using a radio frequency identification (RFID) communication system and at least one communication device configured to receive locator information from at least one of the plurality of locator elements. The radio frequency locator system further includes a user interface configured to display location information based on the received locator information and includes a plurality of user input fields configured to receive a user input to define a search criteria.

In another embodiment, a user interface for determining location information is provided that includes a plurality of user input fields for receiving user inputs and at least one display for displaying a location of a communication device determined by an RFID transmission from at least one locator element.

In yet another embodiment, a method of determining a location of a communication device is provided. The method includes receiving locator information from a plurality of locator elements configured to provide RFID communication, determining a location of a communication device based on the locator information, and displaying the location of the communication device on a display based on the determined location.

In still another embodiment, a radio frequency locator system is provided that includes a plurality of locator elements configured to communicate using a radio frequency identification (RFID) communication system and at least one communication device configured to receive locator information from at least one of the plurality of locator elements. The radio frequency locator system further includes a control system configured to receive the locator information from the at least one communication device via a reverse radio channel including a plurality of intermediate local data hubs.

DETAILED DESCRIPTION OF THE INVENTION

Various embodiments of the invention provide a system for locating portable communication devices, such as transceiving devices, and more particularly, individuals carrying these portable transceiving devices. In general, radio frequency identification (RFID) devices are positioned throughout an area, for example, at different locations within a building. These RFID devices are then used to provide a system that continuously monitors the area to determine the location of the portable communication devices.

Figure 1:
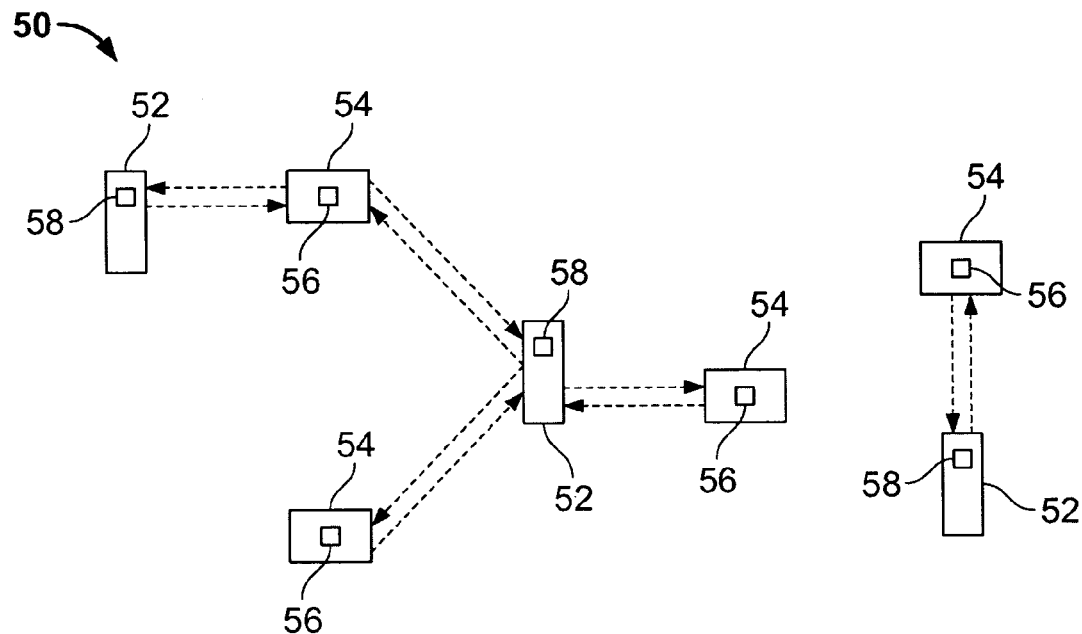
FIG. 1 is a block diagram of a locator system constructed in accordance with an exemplary embodiment of the invention.

Specifically, and referring to FIG. 1, a locator system 50 constructed according to various embodiments of the invention includes a plurality of locator elements 52 and a plurality of communication devices 54. More particularly, the locator elements 52 and the communication devices 54 communicate via radio frequency (RF) and generally operate in accordance with known RFID communication systems. In an exemplary embodiment, the locator elements 52 are RFID identification tags and the communication devices 54 include an RFID reader or interrogator. The locator system 50 operates on close proximity electromagnetic or inductive coupling of the locator elements 52 and the communication devices 54, or alternatively operates using propagating electromagnetic waves.

It should be noted that more than one communication device 54 may be in detection proximity of more than one locator element 52. It also should be noted that other forms and types or wireless communication may be utilized instead of RFID communication, including, for example, infrared communication.

In various embodiments the locator elements 52 are passive radio reflective identification tags or RFID tags. Essentially, these passive RFID tags do not include a battery or other power source and when radio waves from a reader or interrogator 56 are detected by an antenna 58 of the locator elements 52, the energy is converted by the antenna 58 into electricity that can power up, for example, a microchip (not shown) in the RFID tags. The RFID tag is then able to communicate, and more particularly, transmit to the interrogator 56 of the locator elements 52 information stored in the microchip. For example, the information transmitted may include the time and date of the transmission, the location of the locator element 52 transmitting the information, etc. and which is generally referred to herein as locator information. It should be noted that the communication device 52 may have to add this locator information to the "passive" RFID tag information after the locator information is received.

In other various embodiments, the locator elements 52 are active radio identification tags or RFID tags. Essentially, these active RFID tags include a transmitter (not shown) to communicate, and more particularly, transmit (as opposed to reflecting back) to the reader of the locator elements 52 the locator information. The active RFID tags use a battery or other power source (e.g., optically powered) to transmit the signal to the reader of the locator elements 52.

It should be noted that the plurality of locator elements 52 may include only active RFID tags, only passive RFID tags or a combination of passive and active RFID tags. A determination of which type of RFID tag to use may be based on the particular application, for example, the distance over which the RFID tags must be detected (e.g., long distance versus short distance). This may determined, for example, based on the dimensions and configuration of a building having the locator system 50 implemented in connection therewith.

In various embodiments, the communication devices 54 may be, for example, mobile or cellular telephones, personal digital assistants (PDAs), Blackberry devices, etc. having a reader or interrogator 56 (e.g., specially designed or integrated in existing device). For example, a separate unit may be provided or integrated with these communication devices 54. Alternatively, components within, for example, the cellular telephone, such as the transceiver, processor and/or software may be modified to provide the same functionality and operation of the reader or interrogator 56. Still other alternatives include a plug-in or add-on unit for the communication device 54, such as, a plug-in module for a PDA that includes therein the reader or interrogator 56. The communication devices 54 also may be separate units, for example, radio or other communication units.

Figure 2:
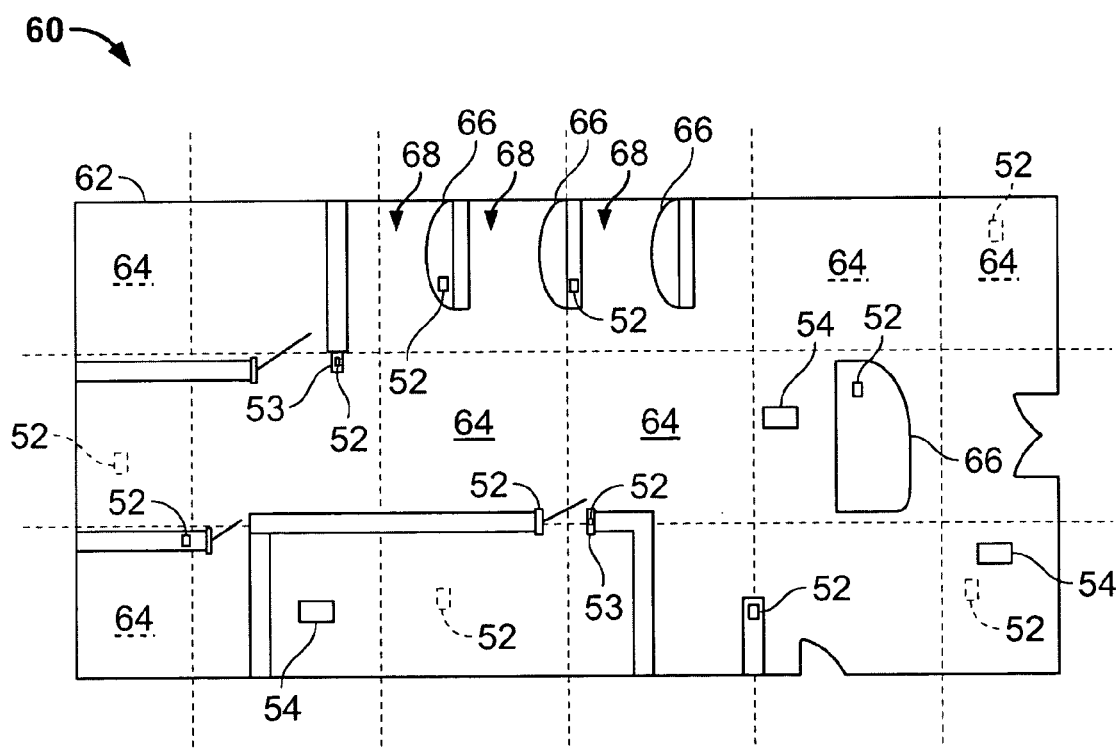
FIG. 2 is a schematic block diagram of building having a locator system constructed in accordance with an exemplary embodiment of the invention.

As shown in FIG. 2, the locator system 50, in an exemplary embodiment, is implemented in connection with a building 60, for example, in connection with each floor 62 of the building 60. Specifically, a plurality of locator elements 52 are positioned throughout the floor 62. For example, locator elements 52 may be provided at each doorway (e.g., in the door frame 53 or door jamb and hallway intersection, in the floor, in the wall, in the ceiling, etc. In other embodiments, the locator elements 52 may be provided at spaced intervals, for example, spaced apart a predetermined distance or spaced apart based on the range of the locator elements 52 such that there are no gaps in coverage. Still other embodiments provide that the locator elements are positioned every predetermined number of square feet or within each of a plurality of defined regions 64 of the floor 62 or within a certain number of the regions 64. The locator elements 52 also may be provided in connection with different components on the floor 62, such as, for example, in connection with furniture including a desk 66 or cubicles 68, the flooring, the carpeting, etc.

Figure 3:
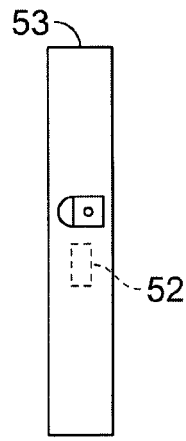
FIG. 3 is a side elevation view of a door frame having a locator constructed in accordance with an exemplary embodiment of the invention.
Figure 4:
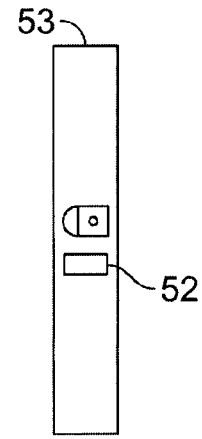
FIG. 4 is a side elevation view of another door frame having a locator constructed in accordance with an exemplary embodiment of the invention.

It should be noted that the positioning or placement of the locator elements 52 may be mixed or varied such that, for example, locator elements 52 are placed both in doorways and in various fixtures. It also should be noted that the locator elements 52 may be integrated or positioned within certain areas, on top of certain areas, etc. For example, the locator elements 52 may be units that have adhesive backing for mounting to the outside of a door frame 53 as shown in FIG. 4, for mounting under a desk 66, etc. In other embodiments, the locator elements 52 may be integrated or installed within a component, for example, provided inside a door frame 53 as shown in FIG. 3, manufactured and sealed within a desk 66 or mounted under or within carpeting. Further, the positioning and placement of the locator elements 52 may be provided generally as desired or needed, for example, based on the application, configuration, intended use, targeted users, etc.

Figure 5:
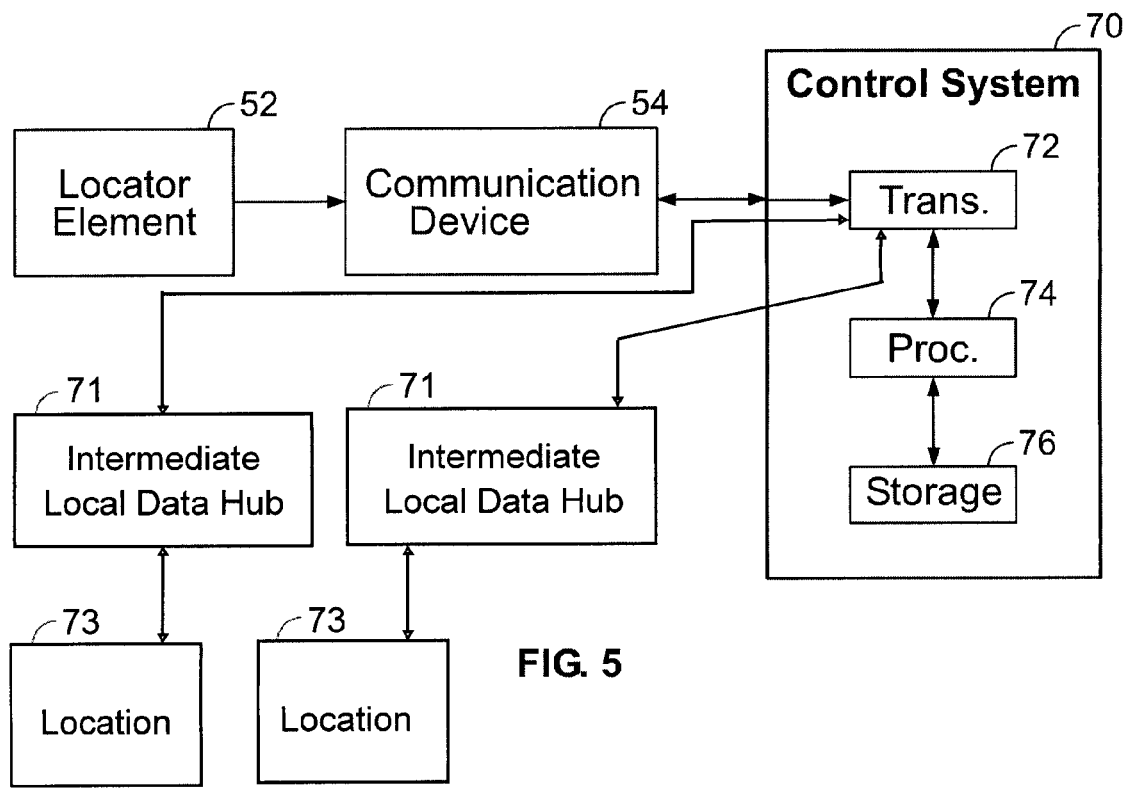
FIG. 5 is a block diagram showing communication with a control system in accordance with an exemplary embodiment of the invention.

In operation, as generally described above, the locator elements 52 communicate with the communication devices 54 to dynamically track and store the location of a communication device 54, which allows locating an individual carrying the device. The locator elements 52 and communication devices 54 may be configured to communicate and operate on different RFID communication bands. For example, the locator elements 52 and communication devices 54 may be configured to operate on a low-frequency band between 125 KHz to 134 KHz, a mid-frequency band of about 13.56 MHz and/or high frequency bands between 850 MHz to 950 MHz and 2.4 GHz to 2.5 GHz. However, the operation of the locator elements 52 and communication devices 54 is not limited to these frequencies, and the locator elements 52 and communication devices 54 may be configured to communicate on lower and higher frequencies (e.g., on frequency bands allocated for particular applications or communications). When a user carrying a communication device 54 (e.g., cellular phone) having a reader or interrogator 56 passes a locator element 52, the locator information from that locator element is transmitted to the communication device 54 as shown in FIG. 5. For example, each locator element 52 may be assigned a unique ID number indicating the location of that locator element 52 in the building 60. The locator information then may be communicated from the communication device 54 (also having a unique ID number) to a control system 70, which may or may not be located in the building 60.

Figures 6, 7:
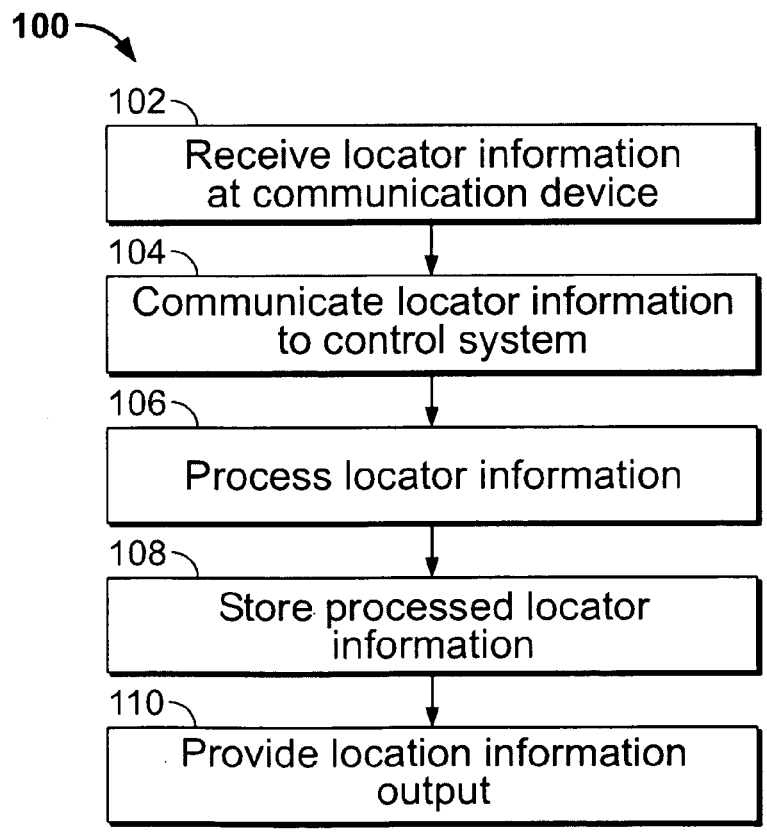
FIG. 6 is a table for storing locator information in accordance with an exemplary embodiment of the invention.
FIG. 7 is flowchart of a method of providing location information in accordance with an exemplary embodiment of the invention.

The control system 70 includes a transceiver 72 for communicating with the communication device 54 and a processor 74 for processing the received locator information. Further, the control system 70 includes a storage device 76 or other memory unit for storing the locator information associated with the detected locator element 52. For example, a database or other table 80 as shown in FIG. 6 may be provided wherein locator information from a detected locator element 52 transmitted from a particular communication device 54 is stored in the table 80 and, for example, associated with the unique ID number. For example, as shown in FIG. 6, the table 80 may include an ID Number (ID #) column 82 listing each of the unique ID numbers for a plurality of locator elements 52, such as, all the locator elements 52 in a building 60 or on a particular floor 62 (all shown in FIG. 2). The table 80 also includes a location column 84 listing a location corresponding to an ID number identifying each of the locator elements 52. For example, the location column 84 may indicate a region 64 (shown in FIG. 2) in which the locator element 52 is located, a door in which the locator element 52 is located, a table 66 (shown in FIG. 2) under which the locator element 52 is located, a longitude and latitude in which the locator element 52 is located, the altitude at which the locator element 52 is located, the floor on which the locator element is located, etc. In general, the location column 84 includes location information to locate the locator element 52.

The table 80 also includes a time column 86 in which is stored the time and/or date the locator information was received from the locator element 52 and/or received and/or transmitted by the communication device 54. The table 80 further includes a device transmitting column 88 indicating the communication device 54 transmitting the locator information. For example, this may be a cellular telephone number, unique serial number, an individual's name registered and associated with the communication device 54, etc. Finally, the table 80 includes a status column 90, which may include information such as the battery life of a locator element 52, the number of detections of a locator element 52 (which may be used to detect a failure of an locator element 52), the time between detections of the locator element 52, etc.

It should be noted that more than one entry may be provided in connection with each ID number. For example, a plurality of different communication devices 54 may have detected the same locator element 52 or a single communication device may have detected more than one locator element 52. Further, it should be noted that the locator information may be stored in the communication device 54, for example, for a predetermined period of time.

Referring again to FIG. 5, the communication between the communication device 54 and the control system 70 is provided wirelessly in the various embodiments. For example, if the communication device 54 is a cellular telephone, then communication is provided using a cellular network. In an exemplary embodiment, the communication between the communication device 54 and the control system 70 is provided using a low data-rate format wherein a reverse radio channel continuously provides communication, for example, data under voice, a dedicated frame within a digital communication channel, etc. This communication link may include an intermediate local data hub 71 serving each major location 73 (e.g., building, arena, etc.). This intermediate data hub 71 facilitates the accumulation, packaging, storing and transfer of the array of locator information to the control system 70. The intermediate data hub 71 can provide for a variety of priority driven options in the information transfer, as well as allowing different transmission media to be used including, for example, a dedicated land-line, wireless means, etc. Alternatively, periodic transmissions may be provided, for example, at predetermined time intervals and/or upon certain events (e.g., incoming or outgoing calls of a cellular telephone or upon a certain number of detections).

It should be noted that redundancy may be provided to the various communications. For example, three transmissions or messages may be transmitted in a predetermined time period. Additionally, different transmission schemes may be implemented as are known, and as needed or desired, to minimize collision or interference of transmitted signals. For example, timing signals may be used or the transmissions may be clocked.

A method 100 of providing location information in accordance with an exemplary embodiment of the invention is shown in FIG. 7. In particular, at 102 locator information is received at a communication device. For example, one or more locator elements, such as passive or active RFID tags, transmit locator information to a communication device passing by and within a range (e.g., three to five meters) of the one or more locator elements. This locator information may be temporarily stored within the communication device or stored for a predetermined period of time. Thereafter, at 104 locator information received by a communication device from one or more locator elements is communicated to a control system. For example, a cellular telephone may communicate received locator information from one or more locator elements to a central control system, which may be located within the building (e.g., security office) or outside the building (e.g., regional headquarters). The locator information received by the control system is then processed at 106. This may include, for example, time stamping the locator information, associating the locator information with a specific locator element, determining movement of a communication device based on detected locator elements, etc. The processing may also include determining non-location information corresponding to the locator device, such as a battery level or a low battery warning, strength of signal, etc.

Figure 8:
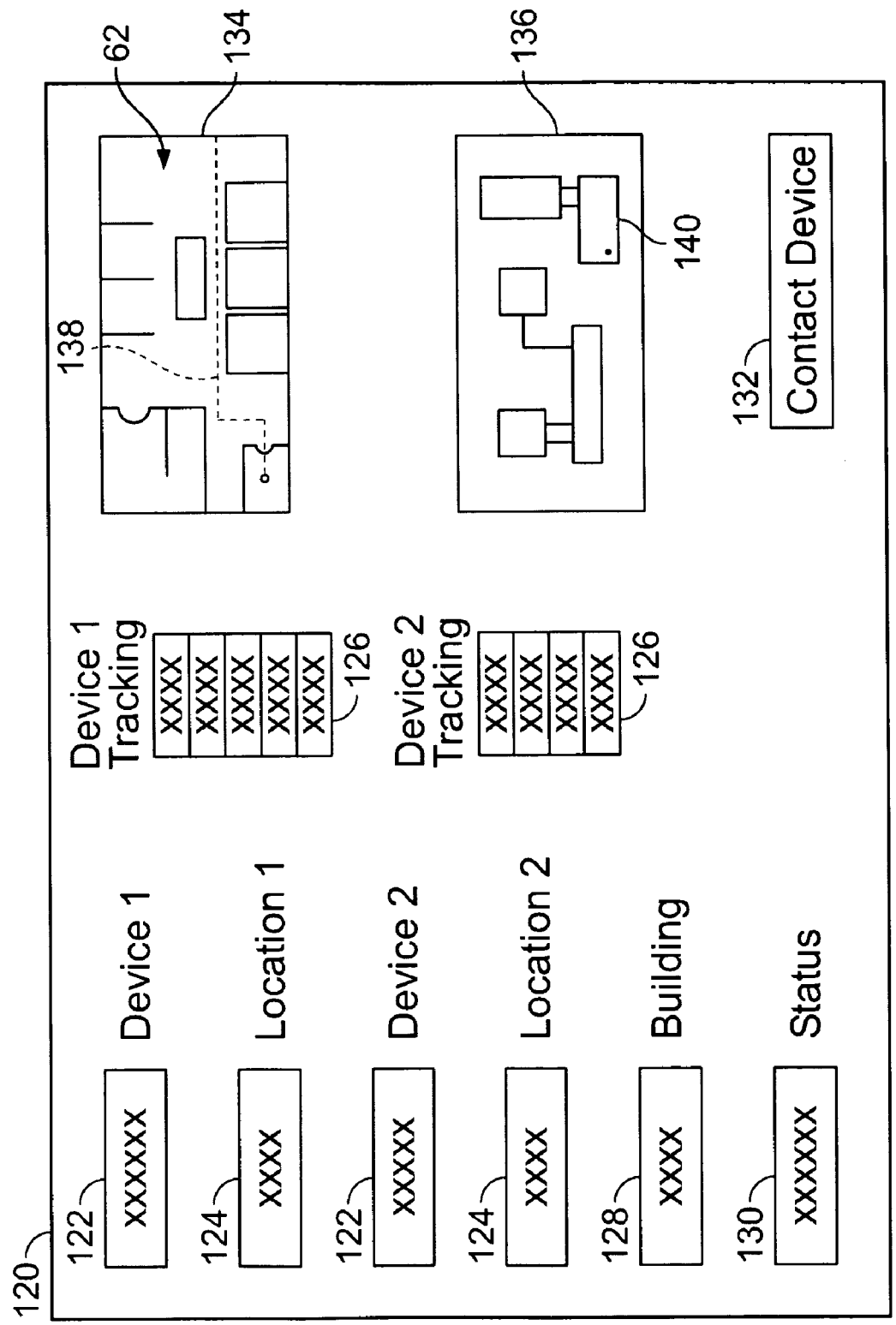
FIG. 8 is a user interface constructed in accordance with an exemplary embodiment of the invention.

The processed locator information is then stored at 108, for example, in a database or table. This storing may include organizing or sorting the processed locator information based on unique ID numbers or other criteria. For example, in addition to storing the processed locator information to correspond to a particular locator element, the processed locator information may be sorted based on time received, communication device from which the locator information was received, movement information (e.g., detection from adjacent locator elements), etc. Thereafter, at 110, the processed locator information may be output on a display and accessed by a user with a user interface 120 as shown in FIG. 8.

More particularly, the user interface 120 may include a plurality of information and user input fields and displays. The user input fields may be used to define search criteria as described in more detail below. Specifically, one or more Device fields 122 are provided (e.g., Device 1 and Device 2) allowing a user to enter a device ID number or name associated with a particular communication device. In various embodiments, the Device fields 122 are configured having a pull-down or drop-down menu from which a user can select from a plurality of communication devices or from a previous list of selected communication devices. The list may include all possible communication devices or may just include communication devices in a particular area or building. Location fields 124 (e.g., Location 1 and Location 2) are provided and indicate the current location of the communication devices, for example, Device 1 and Device 2, respectively. Device Tracking fields 126 (e.g., Device 1 Tracking and Device 2 Tracking) are provided and indicate the different locations of the communication devices, for example, Device 1 and Device 2, respectively, over a period of time or over a number of locator elements. The Device Tracking fields 126 also may indicate a relative direction of the communication devices.

The user interface 120 optionally may include other fields, for example, a Building field 128 displaying the building in which a communication device is located or allowing a user to select a particular building. Based on the selection, other fields (e.g., Device fields) may be automatically populated, for example, with the devices currently in the selected building. In general, selection or entry in one field (e.g., Device field) may populate other fields (e.g., Device Tracking field). Other optional fields include, for example, a Status field 130 displaying the status of one or more locator elements and as described in more detail herein.

Optional functions selectable with selection members also may be provided. For example, a Contact Device selection member 132 (e.g., user activatable button), which may selected using, for example, a computer mouse, allows a user to contact (e.g., radio communication or cellular communication) a communication device.

The user interface 130 also may include one or more displays for providing a visual indication of one or more of the communication devices. For example, a micro display 134 and a macro display 136 may be provided. The micro display 134 shows the location of one or more communication devices within, for example, a floor 62 of a building and may include a device track 138 showing the movement of the communication device based on the detected locator elements. The macro display 136 shows the location of one or more communication devices within, for example, a building 140 within a complex of buildings. These displays generally show a map or visual representation of the floor or buildings with the location of the communication devices indicated thereon. These displays, as well as the user input fields, may be modified as desired or needed to display different or additional information, such as, for example, duration in a particular location, alarm conditions, etc.

Thus, the location and movement of individuals in a building, and in particular, individuals carrying communication devices configured according to various embodiments of the invention can be determined. For example, in the event of a catastrophic event, the last known location of an individual in a building may be determined based on the locator information last transmitted from the communication device for that individual. Also, using the stored and/or archived locator and associated information (e.g., time information), the movement of the individual can be determined. This may be useful, for example, in the event of a failure of the communication device during a catastrophic event or if the communication device is dropped. The locator information thereby provides information useful in locating individuals, for example, in a building after a catastrophic event.

It should be noted that various procedures may be implemented in connection with the locator system. For example, a communication device may be given to each individual entering a building that does not have a communication device. Each of these communication devices may be assigned an ID number.

The various embodiments or components, for example, the control system or controllers therein, or the system for providing the user interface, may be implemented as part of one or more computer systems, which may be separate from or integrated with other systems. The computer system may include a computer, an input device, a display unit and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements may also store data or other information as desired or needed. The storage element may be in the form of an information source or a physical memory element within the processing machine.

The set of instructions may include various commands that instruct the computer as a processing machine to perform specific operations such as the methods and processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

While the invention has been described in terms of various specific embodiments, those skilled in the art will recognize that the invention can be practiced with modification within the spirit and scope of the claims.

What is claimed is:

1. A radio frequency locator system comprising:
    a plurality of locator elements configured to communicate using a radio frequency identification (RFID) communication system;
    at least one communication device configured to receive locator information from at least one of the plurality of locator elements; and
    a user interface configured to display location information based on the received locator information and including a plurality of user input fields configured to receive a user input to define a search criteria.

2. A radio frequency locator system in accordance with claim 1 wherein the displayed location information is configured to provide a visual indication of the location of the at least one communication device.

3. A radio frequency locator system in accordance with claim 1 wherein the displayed location information is configured to provide a visual indication of the movement of the at least one communication device.

4. A radio frequency locator system in accordance with claim 1 wherein the user interface includes a micro display for indicating the location of the at least one communication device on a map of a floor of a building.

5. A radio frequency locator system in accordance with claim 1 wherein the user interface includes a macro display for indicating the location of the at least one communication device on a map of a plurality of buildings.

6. A radio frequency locator system in accordance with claim 1 wherein at least one of the plurality of user input fields is configured to be self-populated with information based on a user input in another one of the plurality of user input fields.

7. A radio frequency locator system in accordance with claim 1 wherein the plurality of locator elements comprise one of active and passive RFID tags.

8. A radio frequency locator system in accordance with claim 1 wherein at least one of the plurality of locator elements is provided in a door frame.

9. A radio frequency locator system in accordance with claim 1 wherein at least one of the plurality of locator elements is provided in connection with a piece of furniture in a building.

10. A radio frequency locator system in accordance with claim 1 wherein at least one of the plurality of locator elements is provided at least under a carpet in a building or in a ceiling of the building.

11. A radio frequency locator system in accordance with claim 1 wherein the at least one communication device is configured to communicate the locator information to a control system.

12. A radio frequency locator system in accordance with claim 11 wherein the communication comprises a redundancy transmission scheme wherein a plurality of messages are transmitted.

13. A radio frequency locator system in accordance with claim 11 wherein the communication comprises a continuous reverse radio channel transmission.

14. A user interface for determining location information, the user interface comprising:
   a plurality of user input fields for receiving user inputs defining at least one of a communication device for which location information is to be displayed and search criteria; and
   at least one display for displaying a location of the communication device determined by an RFID transmission from at least one locator element.

15. A user interface in accordance with claim 14 wherein the plurality of user input fields include at least one of a device field and a building field and further comprising a plurality of information fields including at least one of a location field, a device tracking field, and a status field.

16. A user interface in accordance with claim 14 wherein the at least one display comprises a visual representation of a monitored area showing the location of the communication device thereon.

17. A user interface in accordance with claim 14 wherein the display comprises a device track showing movement of the communication device.

18. A user interface in accordance with claim 14 further comprising a contact device selection member activatable to contact the communication device.

19. A method of determining a location of a communication device, the method comprising:
   receiving locator information from a plurality of locator elements configured to provide RFID communication;
   determining a location of a communication device based on the locator information;
   displaying the location of the communication device on a display based on the determined location; and
   determining movement of the communication device based on the locator information and displaying a movement indication on the display.

20. A radio frequency locator system comprising:
   a plurality of locator elements configured to communicate using a radio frequency identification (RFID) communication system;
   at least one communication device configured to receive locator information from at least one of the plurality of locator elements; and
   a control system configured to receive the locator information from the at least one communication device via a reverse radio channel including a plurality of intermediate local data hubs.

21. A radio frequency locator system in accordance with claim 20 wherein an intermediate local data hub is provided in connection with each of a plurality of locations.

* * * * *